Dec. 24, 1935.  E. E. HOGG  2,025,108
COUPLING OR CLUTCH MECHANISM
Filed Feb. 8, 1934   2 Sheets-Sheet 1
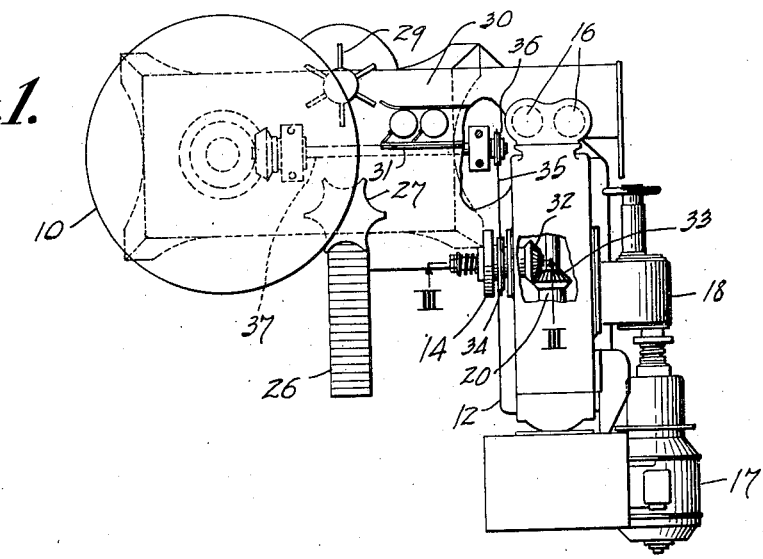
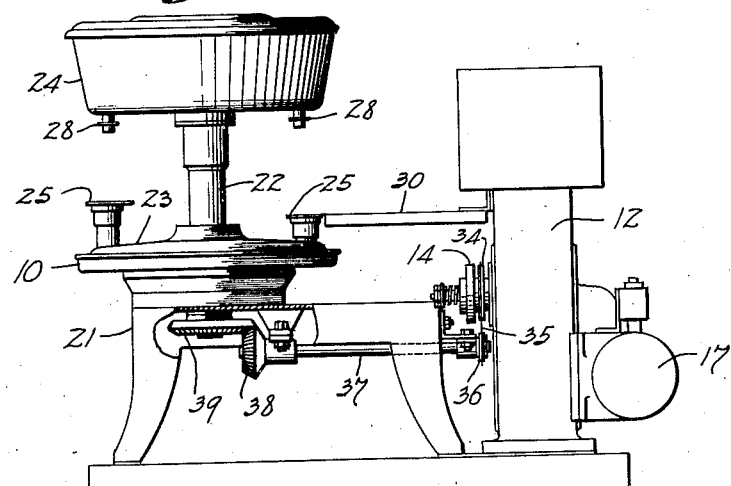
INVENTOR
Emerson E. Hogg.
BY
ATTORNEY Dec. 24, 1935.   E. E. HOGG   2,025,108
COUPLING OR CLUTCH MECHANISM
Filed Feb. 8, 1934   2 Sheets-Sheet 2
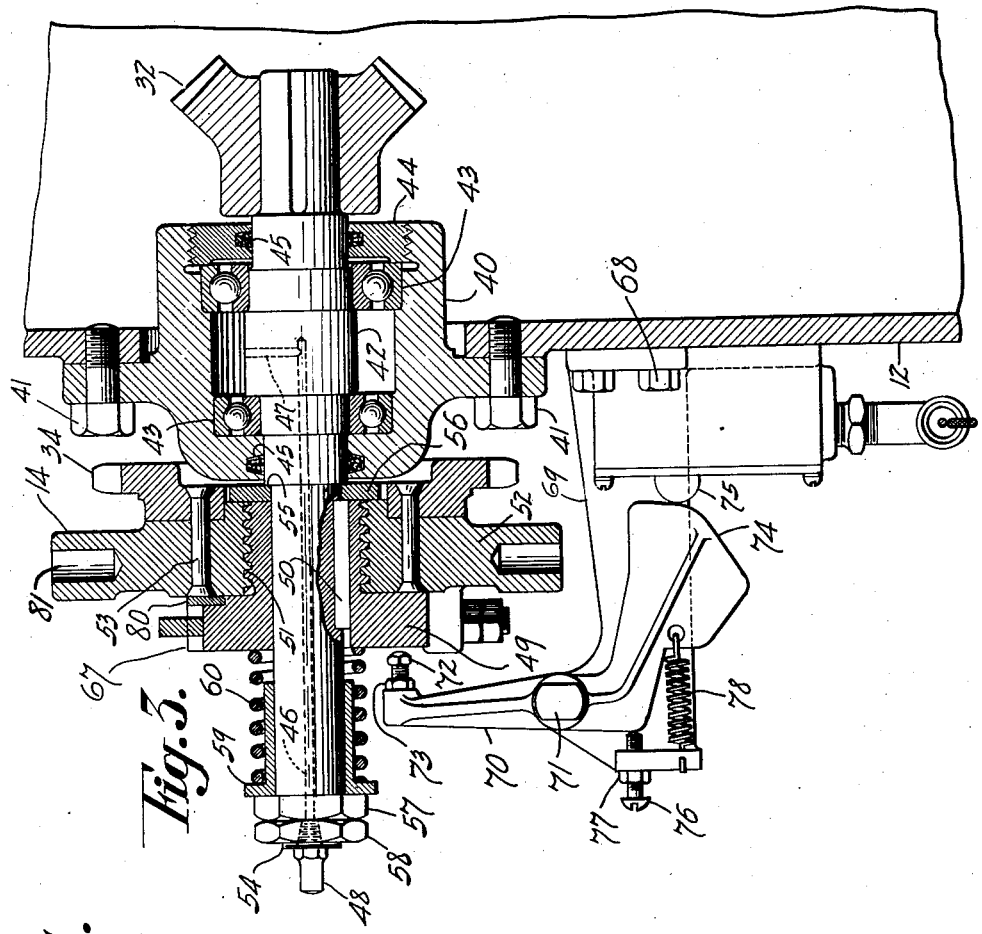
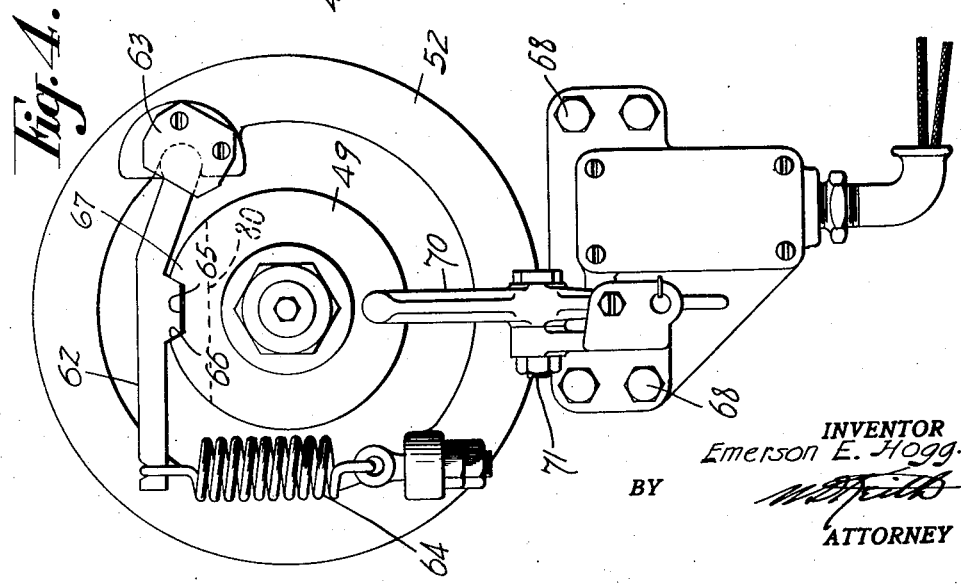
INVENTOR
Emerson E. Hogg.
BY
ATTORNEY Patented Dec. 24, 1935

2,025,108

UNITED STATES PATENT OFFICE 2,025,108

COUPLING OR CLUTCH MECHANISM

Emerson E. Hogg, New Kensington, Pa., assignor to Aluminum Company of America, Pittsburgh, Pa., a corporation of Pennsylvania Application February 8, 1934, Serial No. 710,249

7 Claims. (Cl. 192—150)

The present invention relates in general to clutch or coupling mechanisms for connecting together mechanical units or elements. It is more particularly directed towards a coupling construction which incorporates a safety mechanism insuring automatic interruption or disengagement of the coupled elements on failure of any one of a pair of so-coupled units to complete its function or operation.

The invention is hereinafter described in its association with two separate machine elements or units, a bottle filler and a cap-making and applying mechanism, a coupling or clutch incorporating the characteristics of the invention being employed to connect these two units in coordinated and synchronized relationship. It will be quite manifest to those versed in this art that any two such units, coupled together for synchronized operation, must be susceptible of interruption through their coupling mechanism if and when any one of the mechanisms fails to perform its function. This will be quite obvious, as hereinafter described in more detail, and it is to be understood that the selection of the particular mechanical units, a bottle filler and a cap-making and applying mechanism, are merely representative of any number of mechanisms or devices to which the improved coupling or clutch device may be readily and efficiently associated.

It is an object of the invention to provide a simple and economically constructed clutch or coupling mechanism which is automatic in its operation to disengage the driving connection between two units.

It is also an object of the invention to provide a clutch or coupling device, which, after an interruption of the driving connection between two units coupled together by the device in question, permits the recoupling of the drive between two such coupled units and returns them to the exact period in the cycle of their operation at which the interruption occurred.

It is a further object of the invention to provide a clutch organization which automatically breaks the driving connection between two units and simultaneously breaks the electric circuit incorporating the main driving unit of the coordinated mechanism.

Additional objects and advantages of the invention will present themselves on consideration of the following description when taken in connection with the accompanying drawings forming a part of the invention, in which:

Fig. 1 represents a top plan view of an organized bottle filler and cap-making and applying mechanism coupled together in synchronized relation by means of the coupling device of the invention, parts of the mechanism being broken away to more clearly depict the construction and operation of the organization;

Fig. 2 represents a side elevation of the mechanism shown in Fig. 1;

Fig. 3 represents a sectional elevation, to an enlarged scale, taken along the line III—III of Fig. 1;

Fig. 4 represents an end elevation of the coupling mechanism as viewed from the left of Fig. 3.

Referring in particularity to the drawings, wherein like reference numerals designate similar parts throughout, a bottle-filling apparatus, designated in its entirety by the reference numeral 10, is illustrated as being associated with a cap-making and applying mechanism 12. The coupling or clutch mechanism which forms the essential part of this invention, and which connects the aforementioned separate units 10 and 12 in synchronized, cooperative relation, is designated in its entirety by the reference character 14.

The bottle-filling and cap-making and applying mechanisms herein illustrated have been made the subject matter of United States application for patent Serial No. 585,910, to John E. Sharp and Max M. Kipfer, filed January 11, 1932, and form no part of the present invention. In order, however, to more clearly understand the invention and appreciate the important role played by the improved clutch or coupling, a brief description of the coordinated apparatus is included herein.

The cap-making and applying machine 12 is a self-contained unit and comprises in the instant illustration two cap-applying heads 16, the remaining portion of the machine being employed in manufacturing caps or closures. A suitable prime mover or driving motor 17 and transmission 18 are provided for imparting the necessary relative movements between the elements making up the machine 12, a shaft 20 supported within the base of the machine acting in the capacity of a main drive shaft for this purpose. The motor 17 and transmission 18 have been shown as secured to the frame of the cap-making and applying machine but it is to be understood that other suitable arrangements may be used, such as a mechanical belt or chain drive from a prime mover remote from the machine 12.

The bottle-filling machine illustrated herein comprises, briefly, a main base or table structure 21, a vertical shaft 22 extending therefrom supporting a rotary table 23 and a tank or container 24 for the substance to be bottled. Bottle-supporting pedestals 25 mounted on the rotary table 23 receive bottles or containers fed to the filling machine by means of any suitable conveyor, such as the mechanism indicated at 26, a starwheel 27 being provided for transferring the empty bottles from the conveyor 26 to the pedestals 25, which in turn are raised through the rotation of the table 23 into contact with the release valves 28 depending from the under side of the container 24. Such contact with the aforementioned release valves permits fluid, such as milk or the like, the present machine being a milk filling machine, to flow into the bottles, and proper timed rotation of the plate 23 removes the bottles from filling position, lowering the same out of contact with the release valves thereby accurately controlling the level of the liquid in the bottles.

Bottles thus filled are discharged from the filler 10 through the medium of a second starwheel 29 (Fig. 1) upon a table or platform 30. The filled bottles thus discharged are swept along the platform 30 to a position beneath the cap-applying heads 16, any suitable reciprocatory conveyor, such as represented by the reference numeral 31, serving this purpose. It is to be understood that caps made in the machine 12 are lightly applied to the filled bottles at some suitable point between the discharge starwheel 29 and the capping heads 16, suitable mechanism for this purpose being described in detail in the aforementioned application for United States patent, Serial No. 585,910, to John E. Sharp and Max M. Kipfer, filed January 11, 1932.

It will be appreciated from the foregoing, and by those versed in the bottle-filling art, that mechanisms of this nature must be synchronized in such a manner that the filled bottles having caps or closures loosely supported on their open ends will be fed to the sealing heads 16 in correct sequence. For example, in the mechanisms herein illustrated, the heads 16 reciprocate in performing a cap-applying operation, and filled bottles delivered below said heads from the filler 10 must of necessity be directly positioned beneath the sealing heads between successive reciprocations thereof in order that the sealing cycles may be carried out in perfect and proper sequence. In mechanisms of this nature it often occurs that the bottle-filling unit fails to complete an operation, such as would happen if a bottle were incorrectly positioned on one of the pedestals 25 and failed to register with a release valve 28, thereby causing a jamming condition in the filling machine. This might, and quite often does, cause an interruption in the movement of the parts of the machine with disastrous breakage of bottles, particularly when a rigid or positive connection is used between the filler and cap-applying units.

It is therefore a feature of the present invention to provide an impositive connection or coupling member between two such units as 10 and 12 which will permit the interruption of one unit relative to the other, and which will also permit the recoupling of the units following an interruption in such a manner that the units are returned to their exact and proper relative positions with respect to the point in their cycle of operation at which the interruption occurred.

The clutch or coupling mechanism which insures the safety of operation above expressed has been designated in the drawings, in its entirety, by the reference numeral 14. Referring particularly to Figs. 1 and 2, the mechanism 14 is located between the machines 10 and 12, positive connection of the clutch with the main shaft 20 of unit 12 being accomplished through the intermeshing bevel gears 32, 33 and positive connection of the clutch with the bottle filler 10 being accomplished through the sprocket and chain drive 34, 35, 36 to shaft 37. Shaft 37 is connected through intermeshing bevel gears 38, 39 to impart rotation to the various elements of the filler 10.

With particular reference to the clutch or coupling proper (Figs. 3 and 4), it comprises a suitable housing member 40 secured as by cap screws 41 to a vertical side wall of the base of unit 12. Supported within said housing is a stub shaft or shaft 42, deep-grooved ball bearings 43 being provided for supporting the stub shaft and to eliminate end thrust therein. The stub shaft extends a substantial distance exteriorly the base of machine 12, and within the base the aforementioned bevel gear 32 is rigidly secured to the stub shaft in mesh with the bevel gear 33 similarly mounted on shaft 20. The housing 40 constitutes a totally enclosed housing for shaft 42 adjacent its bearings 43, the integral end portion and the oppositely disposed replaceable nut 44 being provided with packing grooves 45, and the cavity within the housing being packed with lubricating oil or grease introduced through the drilled holes 46 and 47, the opening 46 being suitably provided with a lubricant-introducing fitting 48.

The operating elements of the coupling or clutch are supported upon that portion of stub shaft 42 which extends exteriorly the base of the cap-making and applying unit 12. These elements comprises a driving member in the form of a flanged sleeve or bushing member 49 slidably mounted on and secured against relative rotation with respect to the extending portion of the stub shaft 42 by means of a key or spline 50. Upon the exterior cylindrical body portion of the sleeve 49, a heavy thread 51 is provided, a complementary internally threaded nut or driven member 52 being threaded on the sleeve 49 and having secured to one face thereof, as by rivets 53, the aforementioned sprocket 34.

The exteriorly extending portion of shaft 42 is undercut and threaded at its extreme extending end, as indicated at 54, and is also shouldered at 55 adjacent the housing 40. A washer 56, positioned against the shoulder 55, provides a bearing surface for the driving and driven elements 49 and 52 respectively, whereas a nut 57 and lock nut 58, in adjustable threaded engagement with the end portion 54 of stub shaft 42, serve to position a flanged bushing or sleeve 59 slidably mounted upon the stub shaft and supporting a coiled compression spring 60 between its flange and the face of the flanged driving member 49. As will be seen hereinafter the spring 60 is adjustable within certain limits to exert a pressure upon the driving member 49 to urge the same into contact with the washer 56.

A pawl or key element 62 is pivotally mounted at one of its ends in a suitable socket 63 secured to a vertical face of the driven member or nut 52, and the opposite end of the pawl is engaged by a suitable coiled tension spring 64 also secured to the same vertical face of the nut member 52. Intermediate the ends of the pawl members a projection portion or cam-like portion 65 is provided. This protuberance is adapted to enter a complementary cavity or notch 66 formed in the periphery of the flange 67 of the driving member 49 and impositively restrains rotation of the driving member 49 relative to the driven member 52. It is possible, however, to rotate the driving member 49 relative to the pawl 62 or nut 52 when sufficient turning moment is applied to overcome the tension or pull of spring 64. In such a case the protuberance or cam-like portion 65 rides out of the cavity 66, the complementary sloping sides of the protuberance and cavity aiding in this operation.

Secured to the frame of unit 12 adjacent the housing 40, in any suitable manner as by cap screws 68, is a switch mechanism comprising a bracket 69 to which a bell crank 70 is oscillatably secured as at 71. One end of the bell crank is provided with an adjustable screw 72 projecting into the path of movement of the driving member 49, as will be hereinafter explained, a nut 73 providing locking means for securing the screw 72 in adjusted position. The opposite end of the bell crank is enlarged as at 74 to a degree to produce bearing contact with an electrical switch controlling button 75 for the purpose of operating this button in response to oscillatory movement of the bell crank. An adjustable stop mechanism comprising a screw 76 and a nut 77, mounted in threaded engagement in a portion of the bracket 69, extends into buffer relationship with respect to the bell crank 70 and limits its movement in a clockwise direction as viewed in Fig. 3. A spring 78 acts to resiliently return and hold the bell crank lever against the screw 76.

Having fully described the mechanism incorporated in the improved clutch or coupling device, its mode of operation is described as follows: Bottles or other receptacles are fed to the filling unit 10 by way of conveyor 26 and starwheel 27, wherein they are raised into filling position and thereafter discharged by starwheel 29. Filled bottles are conveyed by the reciprocating conveyor 31 into position under heads 16 where the capping operation takes place. The general movements of the various elements making up the organized mechanism herein described are imparted by the motor or prime mover 17, the clutch mechanism 14 acting to connect the units 10 and 12 in synchronized, operative relationship.

Assuming a condition wherein bottles fed to the filler 10 become jammed, or otherwise interrupt the operation of that portion of the drive between the machine units comprising the sprockets 34, 36 and the chain 35, this condition would interrupt the rotation of the driven member 52 but would permit temporary continuance of rotation of the driving member 49 in view of the latter's splined or slidable connection with the stub shaft 42, which is connected to the prime mover 17 as heretofore described.

This condition of relative rotation between the members 49 and 52 causes the driving member to rotate and at the same time assume a translatory movement to the left, as viewed in Fig. 3, the pawl 62, for each rotation of the driving member 49, being raised to remove the protuberance 65 from the cavity 66 in the flange 67. This particular operation continues until such time as the flange 67 collides with the bumper screw 72, positioned in the path of movement of the driving member 49, which action oscillates the bell crank 70 in a manner to cause the portion 74 of the bell crank to actuate the switch button 75, thereby opening the electric circuit to the motor 17 and stopping the same.

It will be obvious that the spring 78 restrains the bell crank 70 against the screw 76 and also that the insert plate 80, suitably attached to the flange 67, acts to hold the pawl 62 out of the recess 66 in the extreme relatively disengaged position of the driver and driven members. Furthermore, the compression spring 60 and sleeve 59 act to resiliently and adjustably urge the driving member towards the driven member to take up any wear which develops at the power-transmitting threads 51.

An important feature of the invention is the particular arrangement of elements in organized relationship whereby the longitudinal travel of the driving member 49 is never such as would permit its total disengagement with the driven member 52. This construction permits the rotation of the driven member 52 by any suitable tool inserted in the sockets 81 to draw the driving member 49 back into position wherein the flange 67 is in abutting relationship with the adjacent face of the driven member 52, the protuberance 65 in registry within the cavity 66 insuring the recoupling of units 10 and 12 in definite timed relationship. The threaded connection 51 between the driven and driving members has been defined as impositive in nature, and it is to be understood by this definition that under sufficient restraining force it is possible to partially disengage the clutch members 49 and 52 and interrupt the prime mover without entirely disengaging the engagement of the threads 51.

While I have shown and described a particular embodiment of my invention, it will be understood that the invention is not limited thereto but may be practiced in numerous other manners within the spirit and scope of the following appended claims.

What I claim is:

1. A coupling device for maintaining individual machine units connected in synchronized operative relationship, comprising a driving member and a driven member, said driving and driven members being connected through the medium of a power-transmitting thread, a shaft connected to a prime mover and supporting said driving member, said driving member being spline-connected to said shaft and permitted to translate along said shaft on relative movement between the driving and driven members, said relative movement impositively disengaging the driven and driving members, and said translatory movement operating to open a switch in the prime mover circuit.

2. A clutch mechanism for maintaining machine units connected in timed relationship, comprising a driving member slidably mounted upon a shaft connected to a prime mover, said driving member being adapted to rotate with said shaft, a driven member, said driving and driven members being connected through the medium of a power-transmitting thread, said driven member being adapted to transmit power from said shaft to one of the machine units, said driving member being adapted to slide along its shaft into a position of partial threaded engagement with the driven member on interruption of rotation of the driven member, and said translatory movement of said driving member being adapted to stop the prime mover.

3. In a clutch mechanism for maintaining machine units connected together in synchronized relationship, a housing attached to one of the units, a shaft supported in said housing and in direct connection with the main shaft of said mentioned unit, said main shaft being direct connected to a prime mover, a driving member slidably mounted on said shaft, said driving member being provided with power-transmitting threads upon an exterior portion thereof, a driven member provided with interior complementary threads in engagement with said driving member, said driven member being direct connected to another unit for driving the same in synchronized relationship with respect to said first-mentioned unit, means adjacent said driving member and normally out of contact with the same, said driven and driving members being adapted to partially separate on relative movement of one member with respect to the other to translate said driving member along its supporting shaft, said driving member being adapted during translatory movement to stop the prime mover, and said threaded connection between driving and driven members permitting positive reengagement thereof and resumption of synchronized operation from the point in a cycle of operation at which the interruption occurred.

4. In a coupling device for maintaining machine units connected in synchronized relationship, a driving means and a driven means, a power-transmitting connection between said driving and driven means, said connection being positively and completely engaged during normal operation of the machine units and in partial positive disengagement on interruption therein, said partial disengagement of the power-transmitting connection insuring reestablishment of the connection at the point in a cycle of operation at which the interruption occurred.

5. In a coupling device for maintaining machine units connected in synchronized relationship, a driving means and a driven means, a power-transmitting threaded connection between said driving and driven means, said threaded connection being completely engaged during normal driving operation and partially separated on interruption therein, and means supported on said driven means and engageable with said driving means adapted to insure reestablishment of complete engagement of said threaded connection at the point in a cycle of operation at which the interruption occurred.

6. In a coupling device for maintaining machine units connected in synchronized relationship, a driving means and a driven means, a power-transmitting connection between said driving and driven means, said connection being positively and completely engaged during normal operation of the machine units and in partial positive disengagement during an interruption in a cycle thereof, said partial disengagement of the power-transmitting connection insuring reestablishment of the connection at the point in a cycle of operation at which the interruption occurred, and means actuated by said partial disengagement of the power-transmitting connection adapted to interrupt power to said driving means.

7. In a coupling device for maintaining machine units connected in synchronized relationship, a driving member and a driven member, said driving member being slidably keyed to a shaft connected to a prime mover, said driven member being connected through a power-transmitting thread to the driving member, a pawl pivotally secured to the driven member and adapted to enter a cavity in the driving member, said pawl being adapted to impositively maintain the threaded connection but permit partial separation of the driving and driven members at their threaded connection in response to an interruption in a cycle of operation of the synchronized units, said partial separation of the threaded connection insuring reestablishment of driving relationship between the driving and driven members at the point in a cycle of operation at which the interruption occurred, and means actuatable by the partial separation of the threaded connection for interrupting power to the prime mover.

EMERSON E. HOGG.